Dec. 1, 1936.    E. A. ROCKWELL ET AL    2,062,824
APPARATUS FOR CONTROLLING ENGINES
Filed Aug. 13, 1931    2 Sheets-Sheet 1
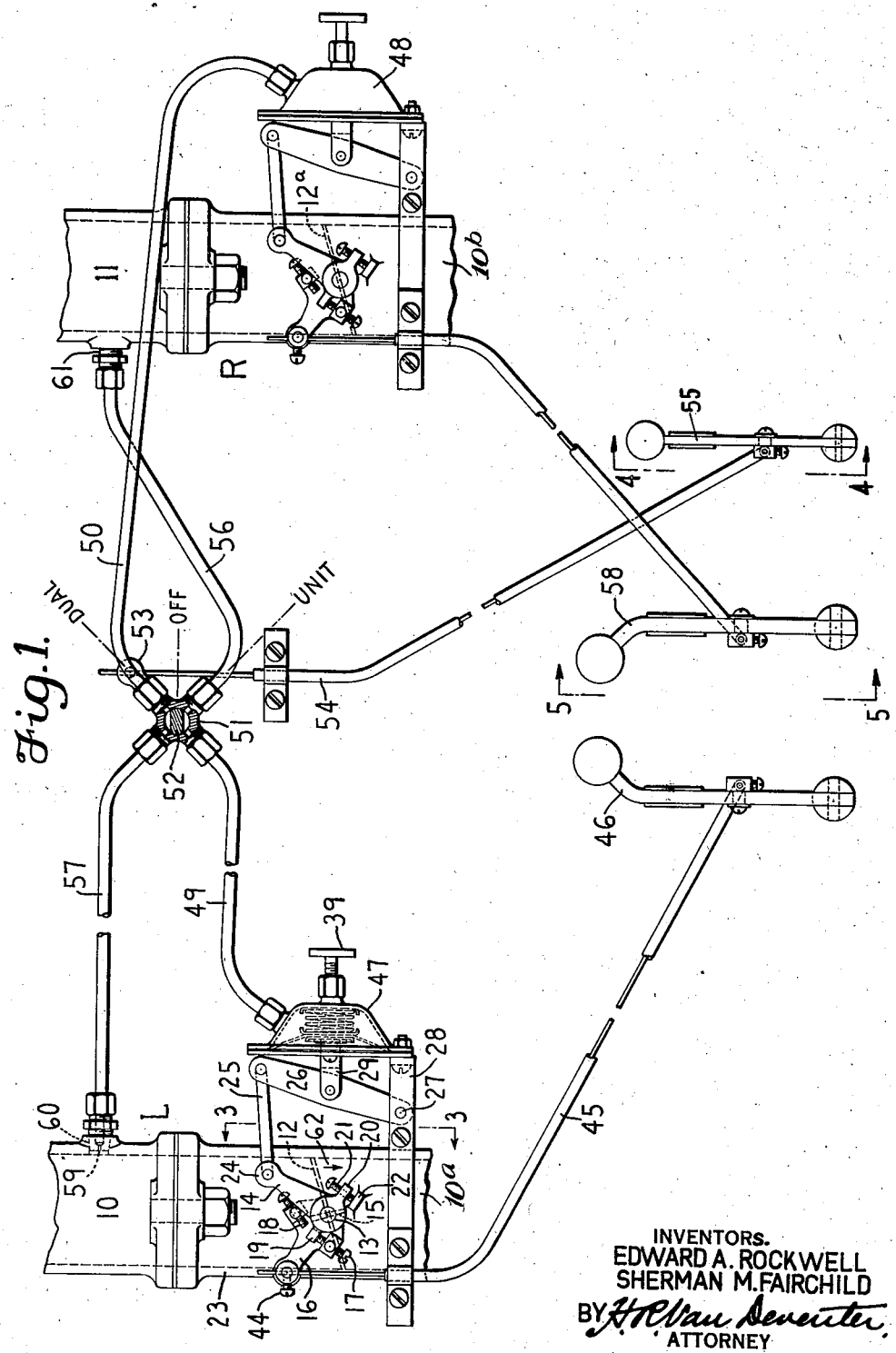
INVENTORS.
EDWARD A. ROCKWELL
SHERMAN M. FAIRCHILD
BY H. C. Van Deventer
ATTORNEY

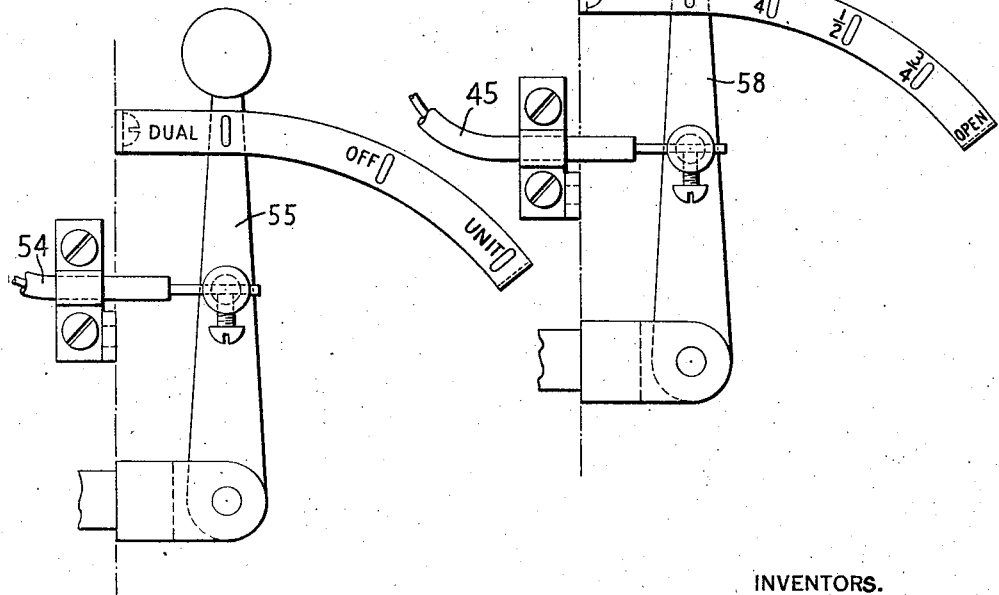

Patented Dec. 1, 1936

2,062,824

UNITED STATES PATENT OFFICE 2,062,824

APPARATUS FOR CONTROLLING ENGINES

Edward A. Rockwell, Chicago, Ill., and Sherman M. Fairchild, New York, N. Y.

Application August 13, 1931, Serial No. 556,763

7 Claims. (Cl. 60—97)

This invention relates to apparatus for controlling engines, and more particularly relates to automatically controlling an engine in accordance with variations in the load.

An object of the invention is to provide a method of controlling an engine by the utilization of the pressure in the fuel intake or charge forming device leading to the cylinder or cylinders of the engine.

Another object is to provide a method of controlling two engines wherein one engine is controlled by the pressure in the fuel intake or charge forming device of the other engine.

Another object is to provide a method of coupling the control elements of two engines so that the control will produce a differential governing action as more fully hereinafter described.

A further object is to provide apparatus constituting load control governors for dual engines whereby the speed of one engine will be controlled relative to the load on the other engine.

The improved method forming the subject matter of this invention may comprise two or more of the following steps:

(a) Providing the engine with any means such as the usual hand control for controlling the throttle or fuel admission valve of the engine;

(b) providing means independent of means (a) adapted to control the throttle; and (c) causing means (b) to control the throttle in accordance with the pressure in the fuel intake of the engine.

(d) An additional step is employed where two engines are used which are hereafter designated as engines R and L in which case the control means (b) on engine R is responsive to the load conditions on engine L and vice versa.

In order to illustrate this method as applied to a single engine and two engines, a preferred form of the apparatus necessary to carry out the method is described in the following specification, it being understood that the details herein shown and described are not intended to be limitative of the invention.

By way of illustration, the method will be described as applied to the engines of a motor boat. In motor boats equipped with twin screw propellers it is customary to directly connect each propeller to an engine shaft, the engines not being interconnected in any way. It is also customary to provide each engine with an independent hand throttle control.

Such a known arrangement is shown in the accompanying drawings and to which has been added the additional apparatus necessary to illustrate a preferred embodiment of the present invention. In these drawings:

Figure 1 is a view of the fuel intakes or manifolds of two engines, R, L and their associated throttle valves as commonly used, together with the necessary apparatus to control or govern either or both engines in accordance with this invention;

Figure 2 is a view, partly in section, of a control unit showing a preferred device for use in carrying out the method herein described;

Figure 3 is a side view of the throttle levers looking in the direction of the arrow 3, Figure 1;

Figure 4 is a view of the governor control lever looking in the direction of arrows 4—4, Figure 1; and Figure 5 is a view of the throttle levers looking in the direction of the arrows 5—5, Figure 1.

The engines may be of any type having the usual intake manifolds 10 and 11 for each engine. It will be understood that these manifolds may be of any type of fuel intake or charge forming device communicating with the engine cylinders, and that instead of the throttle valve to be presently described this valve may be any form of control device or valve for admitting the charge of fluid, gas, vapor or mixture for operating the engine. The term "throttle valve" as herein used therefore denotes any type of control valve.

It will be understood that the upper ends of the manifolds communicate with the engine cylinders and that the lower ends 10a and 10b of the manifolds below the throttle valves 12, 12a, Figure 1, are connected to suitable carburetors or other charge forming devices. With such an arrangement, as the load on the engines decreases, the depression in the manifolds above the throttle valves shown in dotted lines at 12 and 12a will increase, and it has been found that this depression or sub-atmospheric pressure in the manifolds varies in a fixed characteristic with the torque load on the engines. It is the utilization of this force to operate the control devices to be presently described which constitutes one essential feature of the method disclosed and claimed herein.

Obviously certain operating conditions must be assumed in order to properly understand the foregoing condition,—that is to say, the settings of either of the hand throttles to cause its associated engine to operate within predetermined speed limits for a given load, must be assumed.

This is accomplished by setting the screws 17 and 18 to define the working range of boss 19 on lever 14 attached to the throttle valve. With the hand throttle so set the control units operated by the pressure in the intake manifold will then control the throttle valve within the working range of lever 14. The "working limit" or "range" is such that the engines will be governed regardless of the load or any variation of the load within the speed or load limits allowed for.

The purpose of such control may be
(a) To cause both engines to operate at the same speed on the same load.
(b) To cause the engines to operate at different speeds but at the same load.

For example, condition (a) where the engines operate at the same speed and load is often required in motor boats, the hand throttles are both set alike, say at ½, Fig. 5. This opens both throttle valves alike or substantially so and boss 19 on lever 14 attached to the throttle is forced against screw 17 (screw 17 on each throttle is adjusted so that the engines run at the same speed with the same load). Now if there is a variation in load on both engines such as with a head sea when both propellers come out of the water at the same time the engines will keep the same speed. That is to say, will increase and decrease within the limits set by screws 17 and 18.

Condition (b) where the engines operate at different speeds but at the same load is often met with when turning the boat as hereafter referred to. The throttles are initially set as described in connection with condition (a) above. When the load on engine L decreases its control unit 47 acts on engine R to slow that engine up so that the torque load on each engine is the same while the speeds differ within the limits set.

From the foregoing it will be evident that the method herein described and claimed comprises controlling the production of power obtained by the combustion of a vaporized fuel-air mixture by burning it in the cylinder of one engine and controlling the air admitted to said vaporized fuel by power developed by the combustion of another body of vaporized fuel-air mixture, said method comprising a mode of treatment of the fuel-air mixture to produce a given result. This treatment is a series of acts performed upon the fuel-air mixture whereby it is transformed and reduced to the spent gases which are discharged from the engine.

Referring to engine L, the throttle valve 12 is rigidly secured to a shaft 13 to which is secured the outer or control lever 14 secured to said shaft by any suitable means such as the pin 15.

Free on shaft 13 is the inner or hand lever 16 which is provided with adjusting means such as the screws 17, 18, adapted to engage a projecting boss 19 on lever 14. This lever also carries a projecting boss 20 having therein the adjusting screw 21 adapted to engage a fixed projecting portion 22 of the manifold wall 23.

By the foregoing arrangement the throttle valve 12 may be set to any desired position by moving lever 16 which while free on its supporting shaft 13, will in its travel, move lever 14 via screws 17, 18, which will engage the boss 19 on lever 14. These screws permit a certain amount of freedom for the movement of the boss 19 and lever 14 and this range is the range through which the control units (to be presently described) function.

Pivotally connected to the integral projecting arm 24 of the control lever 14 is the link member 25 also pivotally connected to the arm 26, the lower end of which is pivoted at 27 in the fixed arm 28 which may be secured to the manifold or suitably adjacent thereto. The arm 26 is pivotally connected to the control arm 29 as shown, and the inner end of 29 is clamped by the nuts 30, 31, (Figure 2) to the flexible diaphragm 32, the periphery of which is secured to the rear casing 33 of the control unit. The diaphragm is secured in air-tight relation to the periphery of the casing 33 by means of the seal ring 34 and therefore forms within the casing an air-tight chamber 35. A spring 36 is positioned between the end members 37, 38 and normally tends to press the diaphragm outwardly against the pressure of the atmosphere. This spring also enables the diaphragm and lever connections to the throttle valve to be properly adjusted in various positions depending upon the manual adjustment or positioning of the same by the lever 16 and its associated controls.

The tension on spring 36 may be adjusted by any suitable means such as the screw 39 which is held in the nut 40 attached to a neck 41 secured to the rear casing 33. By adjusting this spring the response of the diaphragm to sub-atmospheric pressures within the chamber 35 can be varied.

A threaded boss 42 permits the casing to be connected to a pipe and this forms the only opening into the chamber 35 except a bleed hole 43, the function of which will be later described.

The integral projecting arm 44 on the hand lever 16 is connected via the usual Bowden wire control 45 to the hand throttle lever 46. Any other suitable throttle, either mechanical or electrical, can be used.

The control unit which has just been described, one of which is applied to each engine, constitutes a pressure responsive device and is shown complete in Figure 2. The control units on the engines R and L, Figure 1, are designated respectively as a whole by the numerals 47 and 48, it being understood that the construction and operation of these units are identical.

The control units 47 and 48 are connected via pipes 49, 50 with a valve 51 which may have three positions. The movable member 52 of this valve is rigidly connected to an arm 53 which is connected by means of the usual Bowden wire control 54 to the governor control lever 55.

When lever 55 is in the position "dual" as shown in Figure 4, the arm 53 and the valve member 52 rigidly connected thereto are in the position shown in Figure 1 and the control unit 47 on engine L is connected via pipe 49 and through the valve 51, and via the pipe 56 to the intake manifold 11 of engine R; and the control unit 48 on engine R is connected via pipe 50 and valve 51, and pipe 57 to the intake manifold 10 of engine L.

If the governor control lever 55 is moved to the "off" position then the valve 51 will seal pipes 56 and 57 connected to the manifolds 11, 10 and the control units 47, 48 will be rendered inoperative, and the engines may be operated in the usual manner by means of the hand throttle levers 46, 58.

If the governor control lever 53 is moved to the "unit" position, valve 51 will connect pipe 49 to pipe 57 and pipe 50 to pipe 56 so that each control unit will be connected to the intake manifold of the engine with which it is directly associated.

When the control lever 55 is in the "off" position, the control units must not function, and in the event that valve 51 should leak it might be possible to create sub-atmospheric pressures in the chamber 35 of each control unit; in order to prevent this, the bleed hole 43 is provided in the casing of each unit. This bleed hole 43 is much smaller than the orifice 59 which is conveniently formed in the nipples 60 and 61 in each manifold.

It will be understood that the arrangement and construction of all of the parts of the control units and their associated levers is the same on both engines and while the apparatus used in connection with engine L has been described in detail, that in connection with engine R is not so described in order to avoid repetition.

In operation, assuming that it is desired to control either or both engines manually, the governor or control lever 55 is set at the "off" position. This moves valve 51 to the "off" position and the pipes 49, 50, 56, 57 are sealed from each other so that the control units 47, 48 are inoperative. The throttle valves 12, 12a are operated either singly or together in the usual manner by means of the hand throttle levers 46, 58. As the construction and operation of the Bowden wire 45 and lever 16 and the inter-relation of the latter with the control lever 14 secured to shaft 13 and throttle valve 12 are all old and well understood, and as these parts operate on engine R the same as on engine L as previously described, their operation is not here described in detail.

Assuming that it is desired to automatically control either engine—for example engine L, in accordance with the method herein disclosed, the governor control lever 55 is set on "unit" in which event the valve member 51 will permit of free passage between pipes 49 and 57, thereby connecting chamber 35 of the control unit 47 directly to the intake manifold 10.

The hand throttle lever 46 is now set to the desired running position and the screw 39 in control unit 47 adjusted until the tension on spring 36 therein is such that diaphragm 32 carrying the control arm 29 acts through link member 25 and arm 24 on control lever 14, bringing the projecting boss 19 on same against the end of adjusting screw 17, in lever 16, as shown in Figure 1. The throttle valve 12 is now in the position it was set by hand and the control unit 47 is ready to control the throttle should there be any tendency for the engine to speed up due to a decrease in load.

Assuming that the load on the engine decreases, the depression within the manifold 10 increases and this causes a decrease in pressure in pipe 57, pipe 49 and chamber 35 within the control unit 47. This causes the diaphragm 32 (due to atmospheric pressure on the outer surface thereof being greater than the pressure in chamber 35) to move inwardly, which movement via the control arm 29, link member 25 and arm 24 is communicated to the control lever 14, thereby causing the projection 19 to leave the adjusting screw 17. As the control lever 14 is rigidly secured to shaft 13 and the throttle valve 12, the action just described of the control unit will close the throttle valve 12 in the direction of the arrow 62. Complete closure of the throttle valve may be prevented by the setting of the adjusting screw 21 and the limit through which the control unit may move the control lever 14 and the throttle is limited by the relative adjustment of the screws 17 and 18 in the hand lever 16.

From the foregoing, it will be obvious that by means of the hand lever 46 any desired initial setting of the engine throttle can be obtained and that after this setting is thus obtained, the control unit 47 will function over a certain range limited by means of the adjusting screws as just described, and that the motor will always automatically throttle down as the load on same decreases.

As the amount of depression in the intake manifold 10 is always a function of the load on the motor, it will be seen that this method obtains a perfect load control which is sensitive and accurate, which is entirely free from rapidly revolving parts requiring adjustment and lubrication and is independent of many conditions such as altitude which seriously affect other known forms of control.

When it is desirable to control two engines, the governor control lever 53 is placed in the "dual" position, in which event the valve 51 is in the position shown in Figure 1 and the control unit 47 on engine L is connected to the manifold 11 of engine R, and the control unit 48 on engine R is connected to the manifold 10 of engine L. The hand throttle levers 46 and 58 are set to the desired positions to handle the respective load on each engine. These levers are usually positioned close together so that they can be manipulated together, but it is often necessary to have one engine at a different setting from the other in order to compensate for differences such as frictional losses, differences in engines due to age, difference in the propellers connected to the engines or because of certain weather and other conditions, but in any event, the engines are set by hand to operate together as desired and when so set, the control unit 47 of engine L is governed by the conditions in the manifold of engine R and vice versa.

Assuming that engines R and L are in a motor boat making a turn, and that the load on engine L decreases, obviously the depression in manifold 10 will increase and this increased suction will be applied to the chamber of the control unit 48 on engine R and the diaphragm of said control unit will be drawn inwardly, thereby closing the throttle of engine R and slowing it down.

In the event that the load on engine R decreases, it will cause the control unit 47 to function in connection with engine L, from which it will be obvious that the motor with the least load will always be throttled down or controlled by the motor with the most load (within the limits set by the hand throttles) and that the range over which the automatic control operates may be varied from time to time by a resetting of the hand throttles 46, 58, in order to meet running conditions, but that once set for any condition, the two engines will automatically control their speed relation to each other.

This method of control has the advantage of producing a differential action on a pair of engines which is highly advantageous in connection with motor boats, airplanes or the like.

In the foregoing description, engines have been described wherein a condition of sub-atmospheric pressure is present in the intake manifolds during operation. Obviously, this method of control can be used where the pressures in the manifold or manifolds are above atmosphere, by merely reversing the action of the control units, Figure 2, and rearranging the action of the levers and arms 24, 25, 29. All such modifications are within the scope of the appended claims.

Also, the control units herein described operate as by the resultant of two pressures—one that of the intake manifold and the other a uniform pressure, in this case the atmosphere. This uniform pressure however, may be any other source of uniform pressure such as a weight, spring, a pressure chamber in which the pressure may be varied, or the like.

What is claimed is:

1. In an apparatus of the class described, in combination with an internal combustion engine having an intake manifold adapted to supply fuel to said engine to be burned therein, a valve therein adapted to control the admission of fuel to said engine throughout the normal working range thereof, a shaft for said valve projecting through the wall of said manifold, a control lever secured to the outer end of said shaft, means for moving said lever to turn said shaft including a diphragm responsive to the pressure within said manifold, a second lever carried on said shaft and free to turn thereon, and cooperating means on said levers whereby the movement of said first lever in both of its end positions, the range between which is adjustable, may be controlled by said last lever.

2. In an apparatus of the class described, in combination with an internal combustion engine having an intake manifold adapted to supply fuel to said engine to be burned therein, a valve therein adapted to control the admission of fuel to said engine throughout the normal working range thereof, a control unit having a diaphragm constituting one wall of its casing and forming therewith a sealed chamber, said unit being mounted adjacent said manifold, lever connections between the diaphragm of said unit and said valve, means for manually opening and closing said valves and limiting its range of movement to relatively adjustable end limits, both of which are also adjustable, at any point to provide a working range for said engine, said means also adapted to cooperate with said lever connections, and a connection between said chamber in said control unit and an intake manifold of an engine whereby the diaphragm of said unit may be moved by the pressure in said manifold and caused to control said valve within the working range set by said manual means.

3. An attachment for the intake manifold of an internal combustion engine comprising a control unit having a movable part, means for securing said unit to the manifold, means extending from the movable part of said unit, a lever connected to said last mentioned means, a shaft supporting said lever and extending into the manifold, a valve secured to said shaft and movable therewith, a second lever free to revolve about said shaft, adjustable means on said second lever adapted to engage and move said first lever to open or close said valve and determine the limit of movement thereof, a second engine, having a connection by means of which the pressure in the intake manifold of said second engine affects the operation of said control unit and the control of said valve within end limits, both of which are adjustable, by said second lever and which are also relatively adjustable.

4. In combination with a pair of engines having intake manifolds, manually operable throttle valves in said manifolds, levers rigidly secured to said valves, control units secured to said levers, the control unit of each engine being adapted to be operated by the pressure in the intake manifold of the other engine, and manually operable levers connected to said valves and adapted to move the same to any open or closed position independently of said control units said manually operable levers each having two end stops, whereby the latter may control said valves within end limits, all four of which end limits are adjustable, by said manually operable levers.

5. The combination as claimed in claim 4 wherein a three-way valve is positioned between the intake manifolds of the engines and the control units thereon, whereby each unit may be connected to the manifold of the engine on which it is mounted, or to the engine on which it is not mounted, or both control units may be disconnected from both manifolds.

6. In a control system for two engines, a valve, a control unit on each engine adapted to be operated by pressure in the intake manifold of the other one of the engines, a conduit connecting each of said units with said valve, said valve being adapted to connect each unit to the intake manifold with which it is associated, or to the manifold of the other engine, or to disconnect the control units from the manifolds, and a manual control for said valve.

7. In combination with an engine having a throttle valve, means exposed to and adapted to be operated by the resultant of two pressures derived from two different sources for affecting the operation of said valve, said means comprising a diaphragm, the source of one of said pressures being a duct opening into the intake manifold of an engine, the other of said pressures being derived from the atmosphere, said diaphragm closing a chamber with which said duct communicates, and adjustable means controllable at will for regulating both end limits of the movement of the valve including the flexing of said diaphragm under the influence of said atmospheric pressure.

EDWARD A. ROCKWELL.
SHERMAN M. FAIRCHILD.